Figure 1:
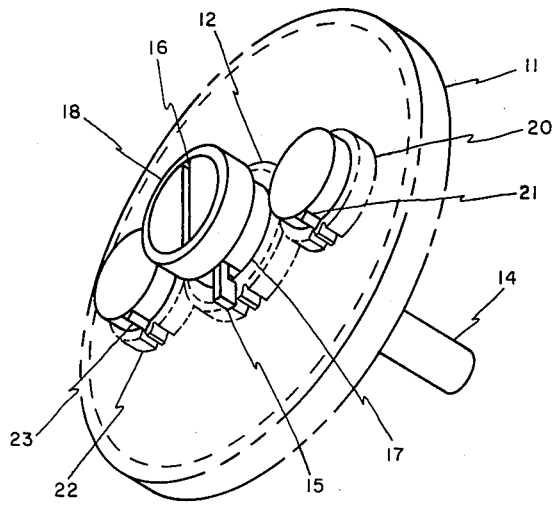

Aug. 31, 1965  E. E. BEER  3,203,262
LIMITED MULTIPLE TURN ROTARY MECHANISM
Filed April 20, 1964

INVENTOR.
EMANUEL E. BEER

BY
ATTORNEY.

United States Patent Office 3,203,262
Patented Aug. 31, 1965

3,203,262
LIMITED MULTIPLE TURN ROTARY
MECHANISM
Emanuel E. Beer, White Plains, N.Y., assignor to General
Precision, Inc., a corporation of Delaware
Filed Apr. 20, 1964, Ser. No. 361,103
6 Claims. (Cl. 74—10.2)

This invention relates generally to limit detecting apparatus and more particularly to a multiturn limit detecting and stop apparatus which is capable of providing a wide range of turns between limit positions.

One prime area of use of this invention is in providing mechanical stops for rotating shafts. This problem is most often encountered in mechanical and electromechanical instrumentation. For example, delicate precision multiturn potentiometers can be damaged if driven into their internal light duty stops. In addition, numerous other devices such as cams, mechanical function generators, etc., may be provided with or otherwise restricted to a limited rotational range and therefore must be stopped before reaching their limit positions. If only a few revolutions need be accommodated between limit positions, simple rotating dogs cooperating with mating stops may be sufficient. However, where a large number of revolutions, such as fifty or more, are required between limits, more complex arrangements are usually necessary.

A number of different multiturn stop mechanisms have been employed in the past. For example, a stack of washers, each with an extending ear, may be slipped over the shaft to be rotated. A lug fastened to the shaft engages the ear of the first washer after the first turn, each successive washer in the stack engages the preceding washer on succeeding turns, and the last washer in the stack engages a fixed stop to halt shaft rotation. While there is no theoretical limit to the number of washers in the stack and thus the number of turns between limits, the axial length of the stop assembly becomes excessive when more than ten or twenty turns are necessary.

Another example of a limited multiple turn rotary drive is the combination of a screw thread with a travelling nut which engages fixed stops at its extremes of travel. This arrangement like the stacked washers has considerable length in the axial direction when designed for a large number of turns.

Yet another example of a prior art limit mechanism is an arrangement in which two meshed gears of substantially equal diameter but having different numbers of teeth have cams attached to each gear which freely pass each other except at the limit positions where they engage to limit further motion. This arrangement unlike those previously described is compact in the axial direction, however it occupies a considerable area normal to the gear axes. Additionally, it is extremely expensive to manufacture since it utilizes a pair of complex cams which are at best difficult to design and fabricate.

Another kind of stop known in the past employs two meshing gears having unequal numbers of teeth. Each gear has a pin perpendicular to its face and a slotted link is slipped over the pins. The length of the slot is selected so that the gears rotate freely until the distance between the pins tend to exceed the slot length, whereupon the gears are locked against further movement by the link. This kind of stop or limit mechanism is unsuited for many applications since it occupies a large area normal to the gear axes and is difficult to incorporate in complete drive mechanism.

A recently developed stop or limit mechanism, as exemplified by application Serial Number 122,271, filed July 6, 1961, now Patent Number 3,147,629, and assigned to the same assignee, overcomes many of the above difficulties, however, while it is compact and easily incorporated in a complete gear drive it is nevertheless larger in size and more costly to manufacture than the limit mechanism according to the subject invention.

The recently developed stop mechanism referred to above in its simplest form comprises two gears of substantially equal diameter mounted for independent rotation about a common axis and axially spaced a distance on the order of the thickness of the gears. The number of teeth in the two gears differ by one and both are driven by a common pinion gear. Thus, the gears rotate at different rates. Near the periphery of each gear on the facing sides a small block is fastened which extends toward but does not touch the other gear. A multilobed cam wheel is mounted for rotation so that the cam lobes extend between the gears and into the paths of the blocks. As the gears rotate the blocks approach each other until a point is reached at which one block engages one cam lobe and the other block another cam lobe which prevents further movement.

It is apparent that the problem of providing for a large number of turns (fifty or more) between positive stops or limit positions in a compact mechanism is not adequately satisfied by existing designs. Accordingly, it is a general object of the invention to provide an improved multiturn stop or limit mechanism.

Another object is to provide a multiturn stop or limit mechanism capable of accommodating a large number of turns between stops or limits.

A further object is to provide a multiturn stop or limit mechanism which is compact in both the axial and radial directions.

Yet another object is to provide a multiturn stop or limit mechanism which may be readily incorporated into existing gear trains.

The invention contemplates a multiturn limit mechanism comprising first, second and third rotary means with said second and third rotary means each drivingly engaging said first rotary means. The turns ratio between said first and second rotary means is made to differ from that between said first and third rotary means. First and second means are mounted off center on said second and third rotary means, respectively, for rotation therewith, and third means is mounted on said first rotary means for rotation therewith so that the limits are defined by the simultaneous coaction between said third means and said first and second means.

The foregoing and other objects and advantages of the invention will become more apparent from a consideration of the specification and drawing wherein a single embodiment of the invention has been described and shown in detail for illustration purposes only.

Figure 2:
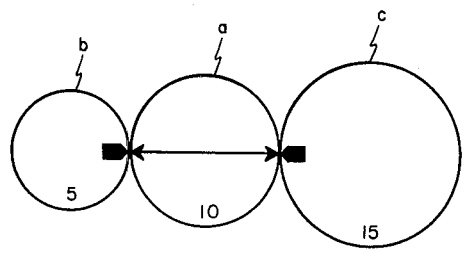
Figure 3:
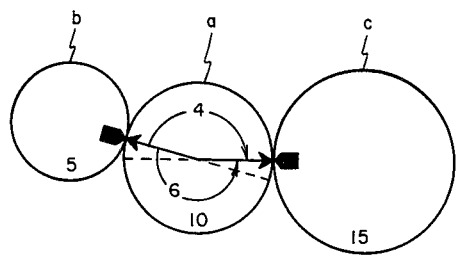

In the drawings:

FIGURE 1 is an isometric view of a novel multiple turn rotary mechanism constructed in accordance with the invention; and FIGURES 2 and 3 are schematic representations for illustrating the operation of the novel mechanism shown in FIGURE 1.

In FIGURE 1 a main toothed support plate 11 mounts all of the elements of the mechanism. A center gear 12 is keyed to a shaft 14 which is journaled in the center of plate 11 in bearings which are not visible. A U-shaped slide bar 15 rests in a slot 16 cut in the hub 17 of gear 12. Movement of slide bar 15 is restricted in the axial direction by a collar 18 pressed on hub 17 and by the body portion of gear 12. Bar 15 is angularly fixed with respect to shaft 14 by the walls of slot 16, however, it is free to move radially a limited distance. The limits of movement are determined by the distance between the inside portions of the uprights of U-shaped bar 15.

The overall radial length of bar 15 is approximately equal to the outside diameter of gear 12 and it is angularly aligned to reside between teeth. Thus if gear 12 has an even number of teeth the bar may be straight and pass through the axis of gear 12. However, if the gear has an odd number of teeth the bar will have to be slightly curved and slot 16 will require a similar modification to position both extremes of the bar between teeth. The bar could alternatively be aligned on a tooth if desired. The reason for this will become apparent as the description continues.

A second gear 20 is keyed to a shaft journaled in gear plate 11 and meshes with gear 12. Gear 20 has a single tooth 21 in planar alignment with sliding bar 15. A third gear 22 is keyed to another shaft journaled in gear plate 11 and also meshes with gear 12. Gear 22, like gear 20, is provided with a single tooth 23 in planar alignment with bar 15. The numbers of teeth in gears 12, 20 and 22 differ from each other and in the embodiment illustrated teeth 21 and 23 are in registration with one of the teeth on its respective gear.

Teeth 21 and 23 and bar 15 will interfere with each other in two positions only at each of which points movement in one direction is prevented. These two points are separated by a number of turns which defines the turns limits of the mechanism. The number of turns between limits will be determined by the gear ratios and the position of bar 15.

In one model gear 12 was provided with 30 teeth while gears 20 and 22 were provided with 29 and 31 teeth, respectively. Slide bar 15 extended through the rotational axis of gear 12 and was angularly aligned between teeth while teeth 21 and 23 were in registration with a tooth on gears 20 and 22, respectively. With this arrangement 449.4 turns were measured between the limits. This agrees within one-tenth of a revolution with the calculated turns. The tenth disparity is the result of a reverse orientation of teeth 21 and 23 and bar 15 at the two limits which reduces the calculated turns by about one to three teeth depending on the pitch of the gears and their pitch diameter.

If gear 12 has $(a)$ teeth and gear 20 and 22 $(b)$ and $(c)$ teeth, respectively, the ratios between gear 12 and gear 20 is $a/b$ and between gear 12 and gear 22 $a/c$. However, bar 15 has two positions within each revolution in which it may interferingly engage teeth 21 and 23 simultaneously, therefore the ratios must be multiplied by ($\frac{1}{2}$) and yield $a/2b$ and $a/2c$. The number of turns may be determined by first finding that factor $(f)$ which when multiplied by each altered ratio yields the smallest whole numbers for each separate multiplication and, second, dividing $(f)$ by (2) to determine the number of turns.

In the above cited example $a=30$, $b=29$ and $c=31$. The two ratios are $$\frac{30}{(2)(29)}=\frac{15}{29} \quad (1)$$

and $$\frac{30}{(2)(31)}=\frac{15}{31} \quad (2)$$

The smallest factor $(f)$ is the product of (29)(31) since 31 is a prime number and $f$ is 899. Therefore, $f/2$ is 449½. As previously pointed out the calculated number of turns is reduced, in this instance, by one-tenth of a turn due to the difference in orientation of the interference alignment at the two limits. The factor of (½) must be employed whenever slide bar 15 is a straight linear bar and completes two cycles for each revolution. In addition, the ratios set forth above must be reduced, however the reduction for each can be carried out independently. Only after this has been done can the factor $(f)$ be determined.

FIGURES 2 and 3 provide an illustration of the device with factor ½ present and the factor omitted. In FIGURE 2 the number of turns may be determined as set forth above $$\frac{10}{(2)(5)}=1 \quad (3)$$

and $$\frac{10}{(2)(15)}=\frac{1}{3} \quad (4)$$

Here the smallest factor $(f)$ is 3 and the number of turns is one and one-half. In FIGURE 3 the bar is bent and the dashed line indicates the position it assumes at any half rotation. Thus it completes only one cycle for each revolution and $$\frac{10}{5}=2 \quad (5)$$

while $$\frac{10}{15}=\frac{2}{3} \quad (6)$$

Here the smallest factor $(f)$ is again 3 but the fraction one-half is eliminated.

A closer examination of the two examples illustrated will reveal their operation. In FIGURE 2 gear $b$ will be in an interfering position every half revolution of gear $a$. However, at the end of one-half revolution the interfering tooth on gear $c$ has moved one-third of a revolution and the interfering tooth on gear $b$ displaces the slide bar. This same situation prevails at the end of one complete revolution of gear $a$ since gear $c$ has completed only two-thirds of a revolution. However, at one and one-half revolutions of gear $a$ the illustrated alignment is repeated. Now if the slide bar has a length equal to the outside diameter of gear $a$ and is located between teeth, the drive will jam since the interfering teeth on gears $b$ and $c$ will want to occupy the space occupied by the ends of the slide bar.

In FIGURE 3 gear $a$ must make one complete revolution before gear $b$ is in an interfering position. However, gear $c$ will have only travelled two-thirds of a revolution. At the end of two revolutions gear $b$ is in position but gear $c$ is one-third revolution past the point illustrated. Not until three revolutions will the illustrated interfering alignment be repeated for the first time. Therefore, displacing the slide bar enough to destroy symmetry removes the factor of one-half.

Slide bar 15 of FIGURE 1 may be between teeth or in alignment with two teeth. If the bar is between teeth, the teeth 21 and 23 must be in registration with a tooth on their respective gears. This situation is limited solely to that case where symmetry exists, i.e. FIGURE 2. In the other case, i.e. FIGURE 3, the bar may have one end between two teeth and the other end in registration with a tooth provided that the gear with which each end coacts is oppositely oriented to provide interference. This cannot be done in the symmetry case because of the half revolution where each end of the slide bar interferes with a different gear at each limit position.

A wide choice of turns is available with the subject invention. However, as a general rule, prime or odd numbers of teeth provide the largest number of turns while even numbers of teeth provide fewer turns. The choice will to a great extent depend on the application. The number of turns may, in addition, be varied if desired by employing additional gearing to divide or multiply the number obtained as pointed out above.

While several embodiments of the invention have been shown and described for illustration purposes only, it is to be expressly understood that the invention is not limited thereto. Various changes may also be made in the design and arrangement of the parts without departing from the spirit and scope of the invention as the same will now be understood by those skilled in the art.

What is claimed is:
1. A multiturn limit mechanism comprising,
first rotary means,
second and third rotary means each drivingly engaging said first rotary means, the turns ratio between said first and second rotary means and between said first and third rotary means differing,
first and second means mounted on said second and third rotary means, respectively, for rotation therewith, and
third means mounted on said first rotary means for rotation therewith whereby the limits are defined by the simultaneous coacting between said third means and said first and second means.

2. A multiturn limit mechanism comprising,
first rotary means,
second and third rotary means each drivingly engaging said first rotary means, the turns ratio between said first and second rotary means and between said first and third rotary means differing,
first and second fixed means mounted off the rotational centers on said second and third rotary means, repectively, for rotation therewith, and
third means mounted on and angularly fixed with respect to said first rotary means whereby the limits are defined by the simultaneous coaction between said third means and said first and second means.

3. A multiturn limit mechanism comprising,
a first gear,
second and third gears each drivingly engaging said first gear, the turns ratio between said first and second gears and between said first and third gears differing,
first and second fixed means mounted off of the rotational centers on said second and third gears, respectively, and
third means mounted on and angularly fixed with respect to said first gear for providing simultaneous interfering coaction between said third means and said first and second fixed means at the limit positions whereby positive stops are provided at the said limit positions.

4. A multiturn limit mechanism comprising,
a first gear,
second and third gears each drivingly engaging said first gear, the turns ratio between the first and second and between first and third gears differing,
a first toothlike member mounted on and fixed in operation with respect to said second gear and arranged for off-axis rotation therewith,
a second toothlike member mounted on and fixed in operation with respect to said third gear and arranged for off-axis rotation therewith, and
a slidable member mounted on and angularly fixed in operation with respect to said first gear, said slidable member and said first and second toothlike members each having a portion thereof lying in a plane normal to the axes of gear rotation and being positioned so that said first and second toothlike members simultaneously engage opposite ends of slidable member at two different angular positions of the first gear whereby a limited number of turns of said first gear are provided between said two angular positions.

5. A multiturn limit mechanism comprising,
a first gear,
second and third gears in meshing engagement with said first gear at opposite peripheral edges thereof, said first, second and third gears having different numbers of teeth,
a protuberance positioned on a side surface of said second gear adjacent the periphery thereof,
a second protuberance positioned on a side surface of said third gear adjacent the periphery thereof,
a bar member mounted on said first gear arranged to be radially slidable with respect thereto, and
said bar member being arranged to engage said protuberances when said protuberances are angularly positioned so as to be directed toward each other.

6. A multiturn limit mechanism comprising,
a first gear,
second and third gears in meshing engagement with said first gear at opposite peripheral edges thereof, each of said gears having a different number of teeth,
a first toothlike member affixed to a side surface of said second gear offset from the axis thereof,
a second toothlike member affixed to a side surface of said third gear offset from the axis thereof,
a bar member mounted on the face of said first gear in fixed angular relation but radially slidable with respect thereto, said bar member including means for limiting the slidable movement thereof, and
said bar member having a length such as to engage both toothlike members when said toothlike members are angularly positioned opposite each other but slidable to disengage a toothlike member when engaged by only one such member.

References Cited by the Examiner
UNITED STATES PATENTS
2,837,925   6/58   Rowley et al. _____ 74—10.2

BROUGHTON G. DURHAM, *Primary Examiner.*
MILTON KAUFMAN, *Examiner.*